(12) United States Patent
Newman et al.

(10) Patent No.: US 8,022,346 B2
(45) Date of Patent: Sep. 20, 2011

(54) AUTOMATIC FAULT DETECTION AND LASER SHUT-DOWN METHOD FOR A LASER-GENERATED WINDSHIELD DISPLAY

(75) Inventors: Timothy J. Newman, Noblesville, IN (US); Richard D. Parker, Tipton, IN (US)

(73) Assignee: Delphi Technologies, Inc., Troy, MI (US)

( * ) Notice: Subject to any disclaimer, the term of this patent is extended or adjusted under 35 U.S.C. 154(b) by 289 days.

(21) Appl. No.: 12/412,470

(22) Filed: Mar. 27, 2009

(65) Prior Publication Data

US 2010/0243858 A1     Sep. 30, 2010

(51) Int. Cl.
*H01J 40/14* (2006.01)
(52) U.S. Cl. .............................. 250/205; 353/12; 353/13
(58) Field of Classification Search .................. 250/205, 250/206, 221, 336.1, 372; 353/11, 12, 13; 398/17; 359/618, 630, 631
See application file for complete search history.

(56) References Cited

U.S. PATENT DOCUMENTS

| 5,428,471 | A | 6/1995 | McDermott |
| 5,771,114 | A | 6/1998 | Andersson et al. |
| 6,194,707 | B1 | 2/2001 | Yang |
| 2001/0005262 | A1 | 6/2001 | Tsurushima |
| 2008/0198335 | A1 | 8/2008 | Kawai et al. |
| 2010/0254019 | A1* | 10/2010 | Cui et al. ............ 359/633 |

FOREIGN PATENT DOCUMENTS

| JP | 2007-094130 | 4/2007 |
| WO | 02/058402 | 7/2002 |

OTHER PUBLICATIONS

European Search Report dated Jun. 9, 2011.

* cited by examiner

*Primary Examiner* — Kevin Pyo
(74) *Attorney, Agent, or Firm* — Jimmy L. Funke

(57) ABSTRACT

The laser of a laser-generated windshield display is controlled to initially deflect the laser beam in the direction of a reflective target disposed outside a display region of the windshield, and a sensor disposed in a reflection path of the target is sampled to detect the presence of a feedback signal that occurs when the laser beam impinges on the sensor. If the feedback signal is detected, the laser beam is deflected onto the display region to generate a driver display; but if the feedback signal is not detected, the laser is automatically turned-off. Once the laser is turned off for lack of a feedback signal, the control is repeated following a specified delay interval so that the driver display will automatically resume the when the condition that prevented generation of the feedback signal is cured.

5 Claims, 3 Drawing Sheets

AUTOMATIC FAULT DETECTION AND LASER SHUT-DOWN METHOD FOR A LASER-GENERATED WINDSHIELD DISPLAY

TECHNICAL FIELD

The present invention relates to laser-generated windshield displays, and more particularly to a method of operation for shutting-down the laser in response to detection of a potentially hazardous fault condition.

BACKGROUND OF THE INVENTION

The viability of using an electronically deflected laser beam to create visible patterns on a vehicle windshield has recently been demonstrated. The laser operates in the non-visible ultraviolet (UV) spectrum, and the visible patterns are produced by a windshield coating that emits visible light when excited by the UV laser energy. In a typical implementation, the laser device is mounted forward of the rearview mirror, and directs a laser beam downward onto the interior surface of the windshield forward of the driver. Potential applications include highlighting significant objects or features in the driver field of view such as road edges, signs, pedestrians, and other vehicles to increase the likelihood that they will be comprehended by the driver.

As with any laser application, care must be taken to detect unusual conditions that present a potential safety hazard to the vehicle occupants or nearby pedestrians, and to shut-down the laser whenever such a condition is detected.

SUMMARY OF THE INVENTION

The present invention is directed to a novel method of operation for a laser-generated windshield display that automatically detects faults that could pose a safety hazard to persons in the vicinity of the display and shuts-down the laser in response to detection of such a fault. During normal operation of the display, the laser beam is deflected onto a display surface that emits light when impinged upon by the laser beam, and the deflection pattern of the laser beam is repeated at a specified frame rate to minimize perceptible flicker of the resulting image. Prior to each frame of the display, the laser beam is deflected in the direction of a reflective target disposed outside the display surface, and a sensor disposed in a reflection path of the reflective target is sampled to detect the presence of a feedback signal that occurs when the laser beam impinges on the sensor. If the feedback signal is detected, the laser beam is deflected onto the display surface to complete the frame; but if the feedback signal is not detected, the laser is automatically turned-off. Once the laser is turned off for lack of a feedback signal, the display process is repeated following a specified delay interval so that the normal display mode will automatically resume when the condition that prevented generation of the feedback signal is cured.

DESCRIPTION OF THE PREFERRED EMBODIMENT

The method of the present invention is illustrated herein in the context of a laser-generated display for the windshield of a motor vehicle, but is more broadly applicable to other displays, automotive or non-automotive, in which a visible or invisible laser beam is directed onto a display surface having a viewable area. In automotive applications, the display may be used to outline objects in the forward field-of-view as mentioned above, but may alternately or additionally be used to display symbols, messages or selected parameter values to the driver.

Figure 1A:
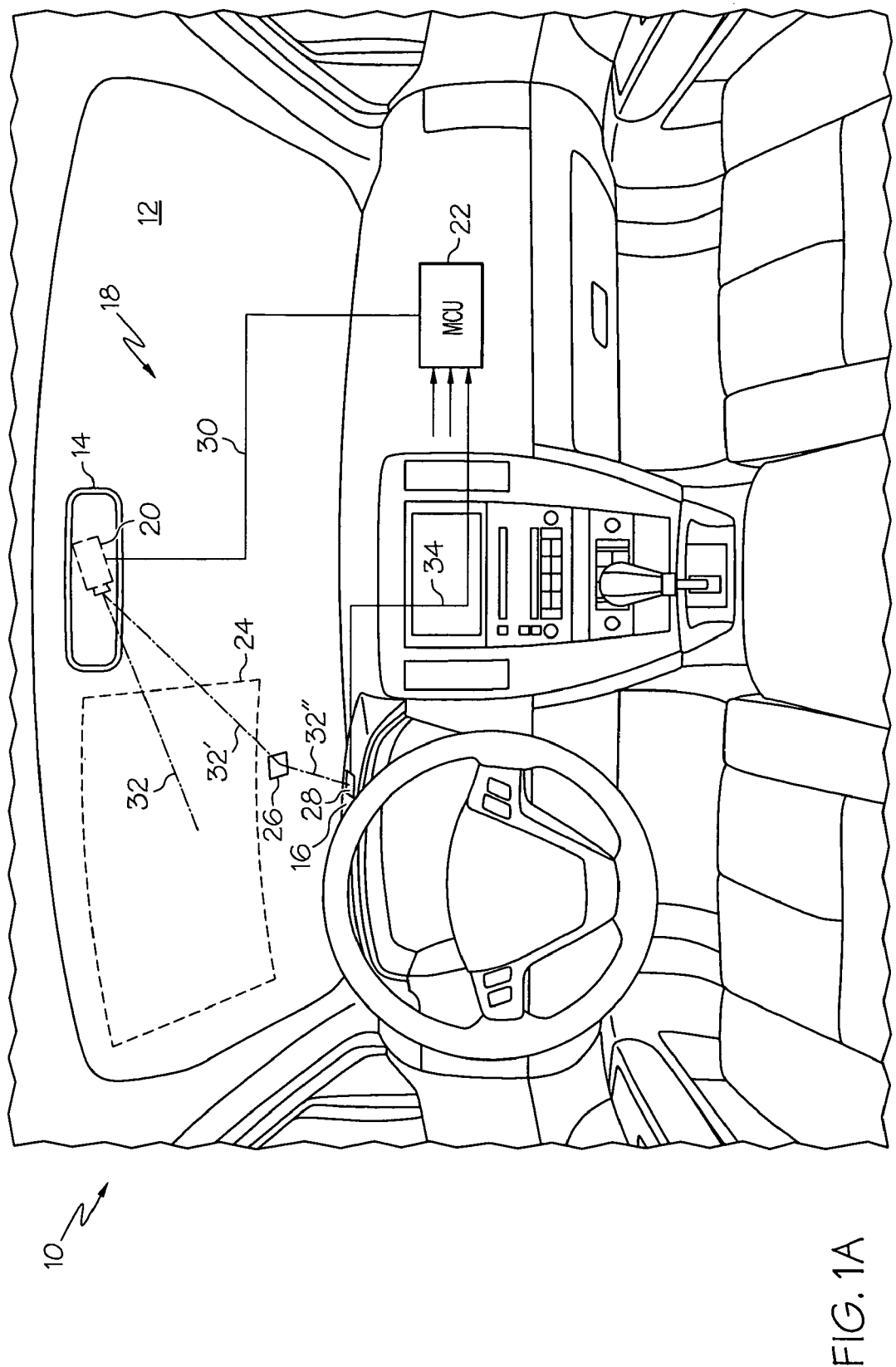
FIG. 1A is an illustration of a laser-generated windshield display system, including a microprocessor-based controller for controlling the laser and carrying out the method of this invention.
Figure 1B:
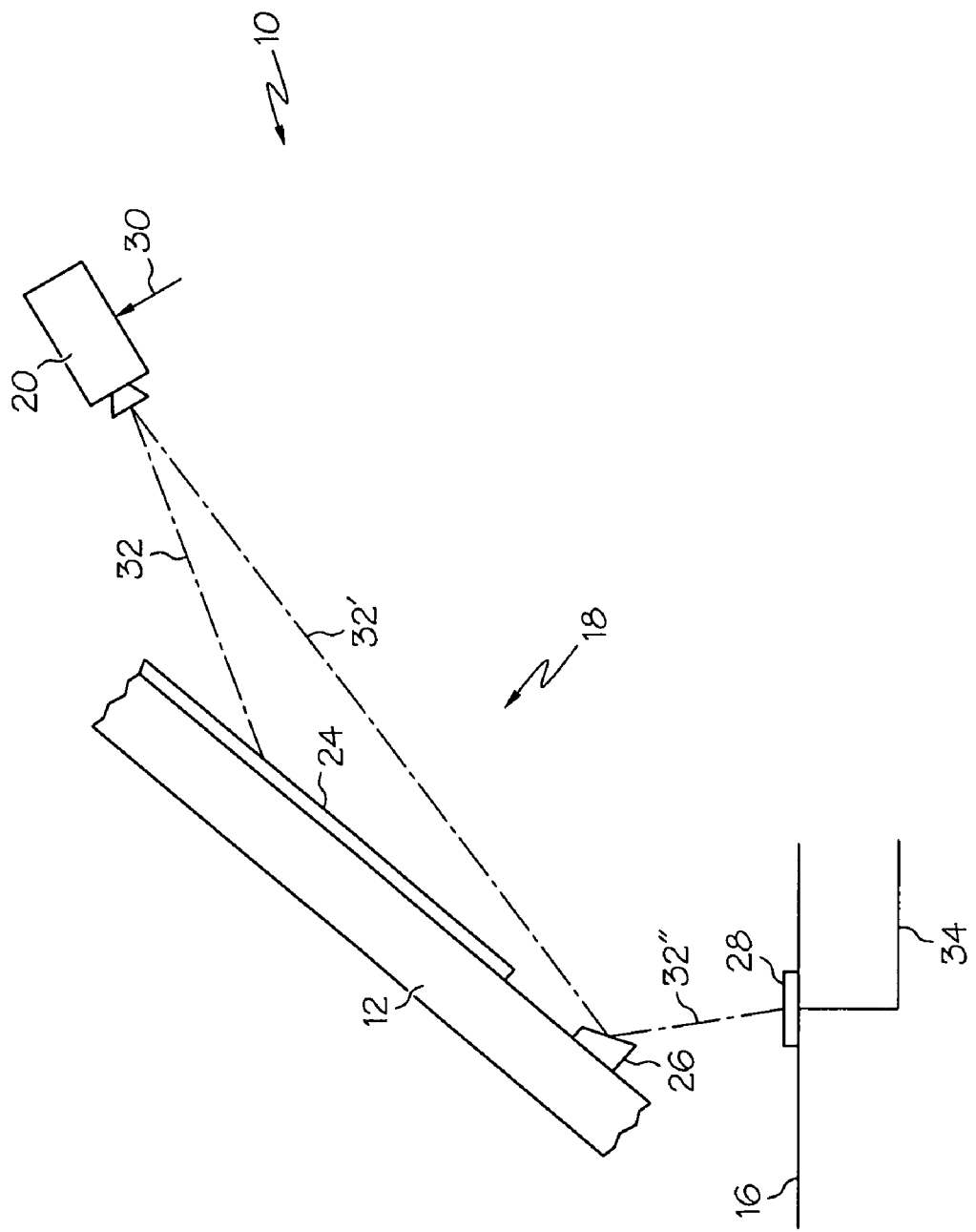
FIG. 1B is a partial cross-sectional view of the illustration of FIG. 1A.

Referring to the drawings, and particularly to FIGS. 1A-1B, the reference numeral 10 generally designates the forward portion of a motor vehicle passenger compartment, including a windshield 12, a rear-view mirror 14, and the upper surface of an instrument panel 16. The reference numeral 18 designates a laser-generated display system according to this invention, including UV laser 20, a microprocessor-based control unit (MCU) 22, a windshield display surface 24, a reflective target 26, and a UV sensor 28. The laser 20 generates a collimated UV laser beam that is activated and deflected under the control of MCU 22 via line 30.

When the system 18 is operating in a normal display mode, MCU 22 deflects the laser beam onto the display surface 24 as indicated by the reference numeral 32. In this mode, the beam trajectories on the display surface 24 produce corresponding images or display patterns forward of the vehicle driver due light emitted from the display surface 24 when excited by the UV energy of the beam 32. The display surface 24 may be a coating of UV-fluorescent material applied to the interior surface of the windshield 12 as depicted in FIG. 1B, or it may be a layer of material sandwiched between two or more layers of windshield glass.

However, when the system 18 is operating in a test mode, MCU 22 deflects the laser beam onto the reflective target 26 as indicated by the reference numeral 32'. The reflective target 26 is located beyond (below, preferably) the display surface 24, but within the deflection range of laser 20, and may be a small patch of UV-reflective material applied to the interior surface of windshield 12. If the laser 20 is operating correctly, the windshield 12 is intact, and there are no obstructions of the laser beam 32', the reflective target deflects the beam 32' downward as designated by the reference numeral 32" onto the UV sensor 28, which is mounted on or in the upper surface of instrument panel 16. The UV sensor 28 provides a feedback signal to MCU 22 via line 34, enabling MCU 22 to confirm proper operation of the system 18 by sampling the sensor output during the test mode. In the event that the expected feedback signal is not received, MCU 22 shuts-down laser 20, and repeats the test procedure following a specified delay interval.

Figure 2:
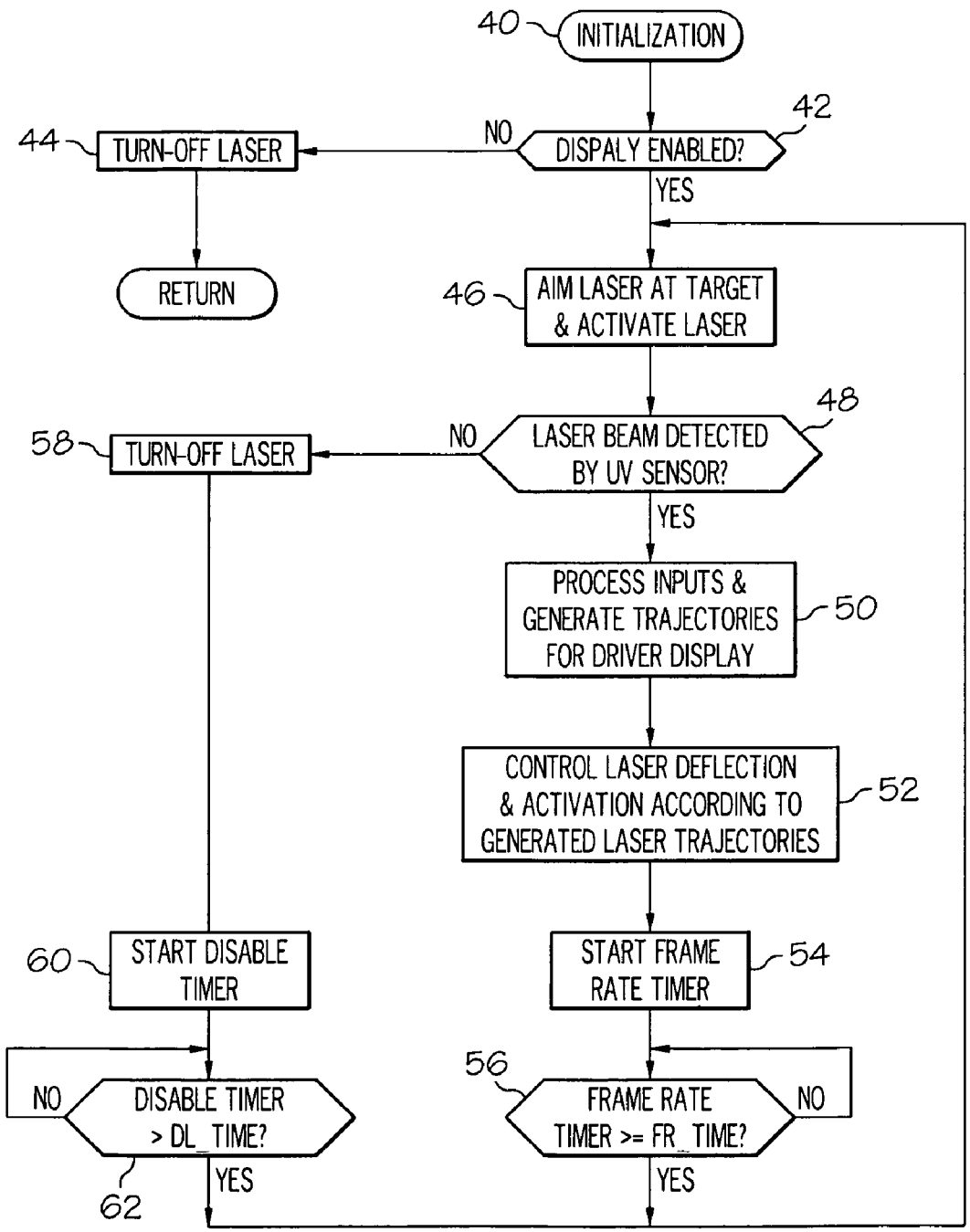
FIG. 2 is a flow diagram representative of a software routine executed by the microprocessor-based controller of FIG. 1A for carrying out the method of this invention.

FIG. 2 depicts a flow diagram representative of a software routine executed by MCU 22 for carrying out the laser control outlined above. At power-on (for example, at each ignition cycle), MCU 22 performs an initialization routine as designated by the block 40, and then executes block 42 to determine if the windshield display function is enabled (by a user-operated switch, for example). If not, the block 44 is executed to power-down laser 20, and the routine is then exited.

If the windshield display function is enabled, block 46 is executed to deflect the laser beam onto the reflective target 26 at a test-level power level that may be lower than the power level typically used during the normal display mode. At block 48, MCU 22 activates UV sensor 28 and samples its output to determine if the sensor 28 is producing a laser-activated feedback signal. If so, correct operation of the system 18 is confirmed, and the blocks 50-52 are executed to activate the display function of the system. At block 50, MCU 22 processes various inputs and generates the laser trajectories required to generate the desired driver images or display patterns. For example, the inputs may include information from vision, radar or other object detection sensors, as well as information about the location of the driver's head. And after the laser trajectories are generated, block 52 controls the laser deflection, activation and power level to produce the desired images or display patterns. The blocks 54-56 establish a suitable update rate (i.e., frame rate) by starting a frame rate timer and comparing the timer value to a specified frame rate time FR_TIME. Once the specified frame rate time is satisfied, blocks 46 and following are re-executed as indicated to repeat the test procedure, and then update the display if the test procedure confirms that the system 18 is operating as expected.

If for any reason, MCU 22 fails to receive a laser-generated feedback signal from the UV sensor 28 at block 48 of the test procedure, blocks 50-56 are bypassed, and the block 58 is executed to immediately turn off laser 20. As indicated above, this may occur due to one of several potential fault conditions, such as misalignment or faulty operation of the laser 20, obstructions of the laser beam path, or loss of the windshield 12. Any of these fault conditions carry the potential for human injury (predominantly eye injury) due to an errant laser beam, and immediately shutting down laser 20 minimizes the risk of any such injury. After turning off laser 20, MCU 22 executes the blocks 60-62 to start a display disable timer and compare the timer value to a specified delay time DL_TIME. The delay time DL_TIME will typically be a multiple of the frame rate time FR_TIME, and once the specified delay time is satisfied, blocks 46-48 are re-executed as indicated to repeat the test procedure. If a fault condition is still in effect, blocks 58-62 are re-executed to maintain the laser turn-off condition for at least another delay interval; whereas if the fault condition has been cured, the blocks 50-56 are executed to resume the normal display mode.

In summary, the method of the present invention provides an effective and easily implemented way of minimizing safety risks associated with laser-generated windshield displays. The precise cause of the fault condition need not be known, and the normal display mode is automatically resumed if and when the fault condition is cured.

While the method has been described with respect to the illustrated system, it is recognized that numerous modifications and variations in addition to those mentioned herein will occur to those skilled in the art. For example, the system may include more than one reflective target, the reflective target may be a light pipe that collects the laser beam energy and focuses it on the UV sensor 28, and so on. Also, the invention equally applies to laser-generated display systems including a laser that emits light in the visible spectrum; thus, the sensor 28 is not necessarily a UV light sensor. Accordingly, it is intended that the invention not be limited to the disclosed embodiment, but that it have the full scope permitted by the language of the following claims.

The invention claimed is:

1. A method of operation for a laser-generated display where a laser directs a collimated energy beam onto a display region, the method of operation comprising the steps of:
   (a) providing a reflective target that is outside said display region but within a deflection range of said energy beam and a sensor positioned in a beam path that is active when said energy beam impinges on said reflective target and is not otherwise obstructed;
   (b) controlling said laser to deflect said energy beam in a direction to impinge on said reflective target and sampling an output of said sensor to detect the presence of a feedback signal that occurs when said energy beam is reflected onto said sensor by said reflective target; and
   (c) controlling said laser to deflect said energy beam onto said display region to produce a laser-generated image if the presence of said feedback signal is detected, but otherwise turning-off said laser.

2. The method of claim 1, including the step of:
periodically repeating steps (b) and (c) at a specified repetition rate.

3. The method of claim 2, including the step of:
preventing the periodic repetition of steps (b) and (c) for a specified interval after said laser is turned off due to a failure to detect said feedback signal.

4. The method of claim 1, where:
said display region occupies a portion of a vehicle windshield; and
said sensor is provided on a vehicle instrument panel disposed below the windshield.

5. The method of claim 1, where:
said energy beam comprises light in a non-visible spectrum and said display region emits light when impinged upon by said energy beam.

* * * * *